Figure 1:
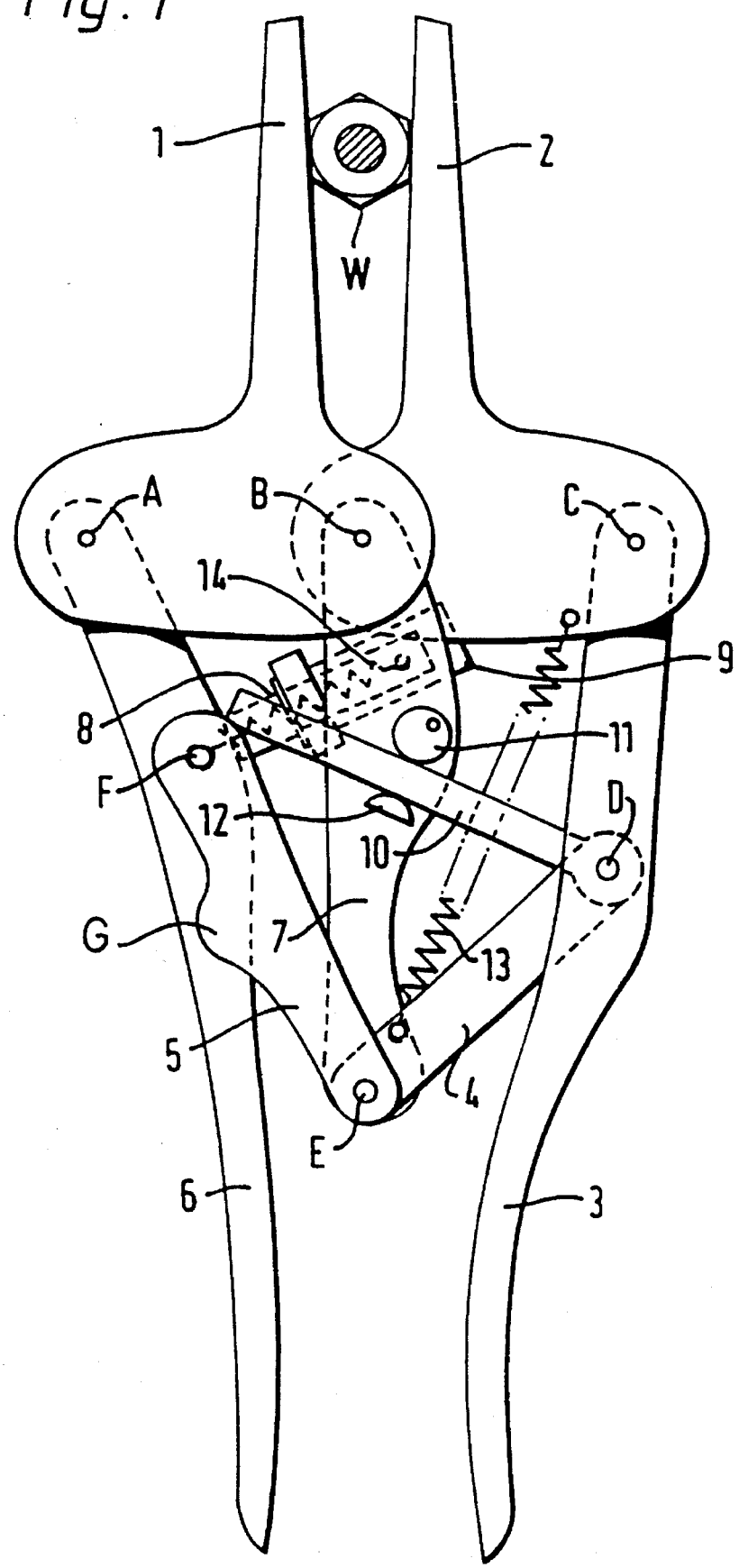

United States Patent [19]
Franklin

[11] Patent Number: 5,469,765
[45] Date of Patent: Nov. 28, 1995

[54] SELF-LOCKING HAND TOOLS

[76] Inventor: Michael J. Franklin, A9 Monte Carlo Villas, 25 Castle Peak Rd., Tuen Mun, Hong Kong

[21] Appl. No.: 167,802

[22] PCT Filed: Jul. 27, 1992

[86] PCT No.: PCT/GB92/01392

§ 371 Date: Dec. 23, 1993

§ 102(e) Date: Dec. 23, 1993

[87] PCT Pub. No.: WO93/01915

PCT Pub. Date: Feb. 4, 1993

[30] Foreign Application Priority Data

Jul. 25, 1991 [GB] United Kingdom .................. 9116134

[51] Int. Cl.$^6$ ........................................ B25B 7/12
[52] U.S. Cl. .................. 81/324; 81/352; 81/367; 269/228
[58] Field of Search ............... 81/318–324, 329, 81/347, 352–355, 361–363, 367–383; 269/228, 227, 221

[56] References Cited

U.S. PATENT DOCUMENTS

| | | |
|---|---|---|
| 1,772,428 | 8/1930 | Palotce . |
| 2,499,201 | 2/1950 | Thayer . |
| 2,620,697 | 12/1952 | Sarvie . |
| 2,635,496 | 4/1953 | Marasco . |
| 3,104,571 | 9/1963 | Trybus . |
| 3,815,894 | 6/1974 | Olson . |
| 4,344,215 | 8/1982 | Dearman ........................... 81/367 X |
| 4,850,254 | 7/1989 | Burney ............................... 81/367 |

FOREIGN PATENT DOCUMENTS

| | | |
|---|---|---|
| 8305123 | 7/1983 | Germany . |
| 3244136 | 5/1984 | Germany ............................. 81/371 |
| 452689 | 8/1936 | United Kingdom . |

*Primary Examiner*—D. S. Meislin
*Attorney, Agent, or Firm*—Richard C. Litman

[57] ABSTRACT

An adjustable wrench has jaws (1, 2) which automatically lock up when a predetermined force is applied to the handgrips (2, 3). The jaws (1 and 2) are closed by forcing together hand grips (3 and 6) which holds pivot F against rubber stop (8) mounted in the housing (9), which in turn is mounted on brace arm (7); pivot D is moved towards brace (7), thus straightening line CDE and rotating jaw (2) and pivot C anti-clockwise about pivot B. When the jaws close on to a workpiece W, resistance is met and further movement of D towards arm (7) is arrested in favor of the over-center linkage arms (4 and 5) whereupon eccentric cam (11) locks rod (10) against anvil (12) thus holding jaw (2). The over-center lock on the hand grip (6) locks and is prevented from going further than just over-center by a stop G which bears on to the inside of the hand grip.

13 Claims, 4 Drawing Sheets

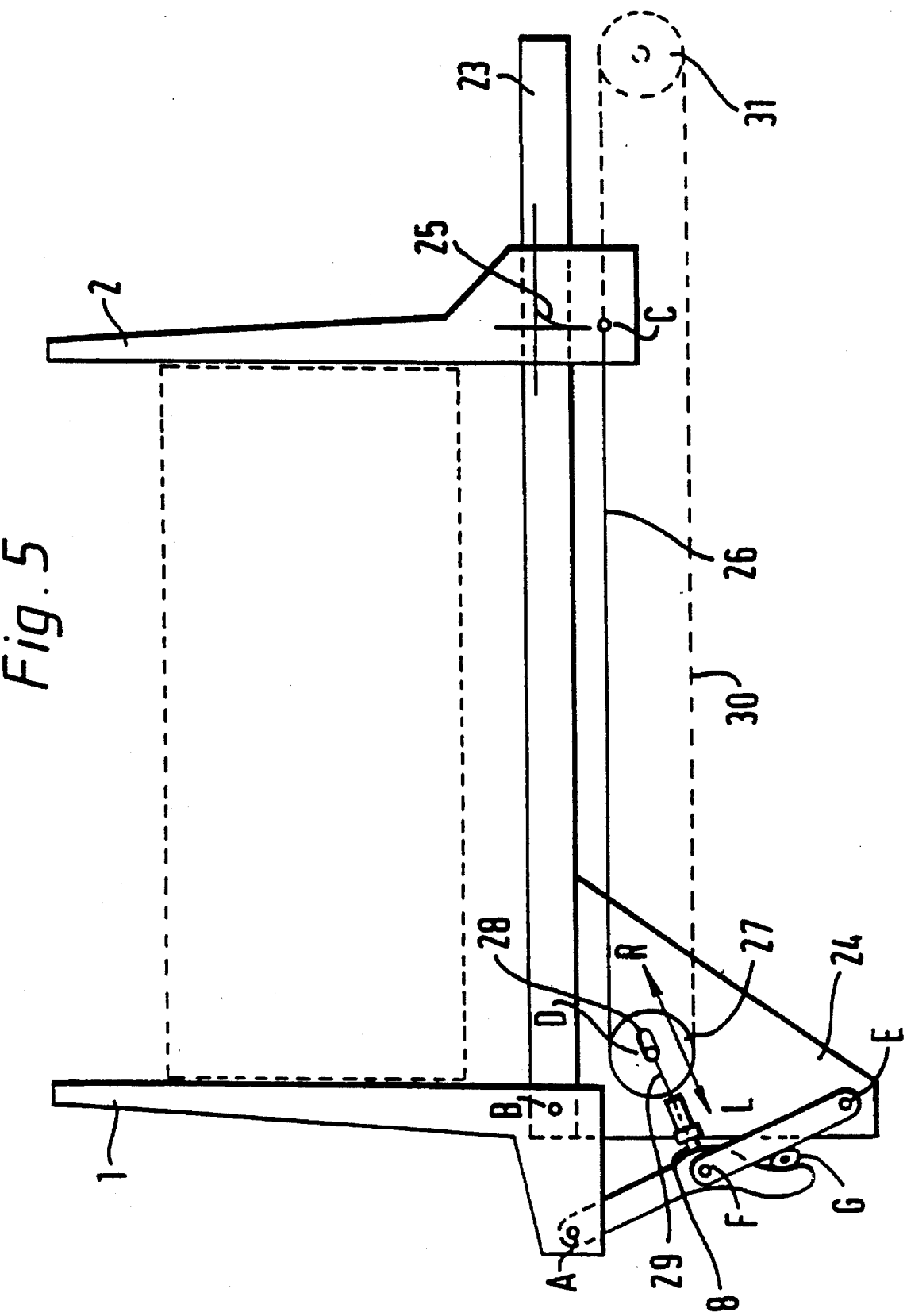

SELF-LOCKING HAND TOOLS

This invention relates to an improved construction of hand tool or wrench having a pair of opposed jaws which may be brought together by operation of hand grips so as to firmly clamp the workpiece, such as a nut or head of a belt, between the two jaws.

Many different constructions of adjustable wrenches are known including a construction commonly referred to as a "mole-grip" wherein the hand grips apply substantial force to the jaws through a lever action following which, by means of an over-centre lock, the jaws are maintained tightly in the closed position until disengaged by a lever which releases the over-centre lock means. An advantage of such a wrench is that a large force may be applied to the hand grips to firmly cause the jaws to be clamped around the workpiece and following operation of the over-centre lock, said force is maintained so that the workpiece is firmly gripped without the need to sustain a hand grip. A disadvantage of the construction is that an adjusting means, usually a screw jack, has to be provided to set the over centre lock so that it operates with an appropriate spacing between the jaws. Thus, the over-centre lock adjuster must be pre-set according to the workpiece to be gripped and such presetting often involves a certain amount of trial and error before the over-centre lock operates following application of sufficient force to ensure firm gripping of the workpiece by the jaws.

One of the objects of this invention is to provide an adjustable wrench wherein an over-centre lock operates following the application of a predetermined force to the hand grips, regardless of the particular spacing between the jaws at any instant. Thus, this invention seeks to provide an adjustable wrench in which the jaws are simply offered up to the workpiece with the hand grips then being forced together following which, and after application of a predetermined force, the over-centre lock operates to retain the jaws in the closed position.

Thus and in accordance with a first aspect of this invention, there is provided a self-locking hand tool including two pivotally interconnected jaws which may be moved together or apart to embrace a workpiece, hand grips pivotally connected to each jaw, an articulated linkage pivotally interconnecting the hand grips and the jaws whereby a force applied between the hand grips causes the jaws to be forced together and an over-centre locking means operatively coupled with the hand grips and the articulated linkage and associated with a spring member whereby on application of a predetermined force to the hand grips, the over-centre lock is caused to be tripped into a position retaining the hand grips and the jaws in a fixed position.

In accordance with a second aspect of this invention, there is provided a self-locking hand tool including two pivotally interconnected jaws adapted to receive and clamp a workpiece, hand grip members pivotally connected to each respective jaw, a brace member pivotally connected to the pivotal interconnection between the two jaws at its one end, with the other end thereof connected by articulated linkages to pivots on each respective hand grip, one hand grip having a locking member co-operating with the brace member and the other hand grip having a spring means with the relevant articulated linkage forming an over-centre lock, the arrangement being such that the one hand grip freely moves the jaw connected therewith and wherein the second hand grip following application of a force above a predetermined level, actuates the over-centre lock displacing the brace member and further locking the first hand grip.

In accordance with a third aspect of this invention there is provided a self-locking hand tool including two pivotally interconnected jaws adapted to receive and clamp a workpiece, hand grip members pivotally connected to each respective Jaw, a brace member pivotally connected to the pivotal interconnection between the two jaws at its one end, with the other end thereof connected by respective articulated linkages to pivots on each respective hand grip, one hand grip having a displacement member to lockingly engage the brace member and the other hand grip being connected through a spring means with the brace member, and further being coupled with the relevant articulated linkage, said linkage forming an over-centre lock, the arrangement being such that the one hand grip freely moves the jaw connected therewith and wherein the second hand grip following application of a force above a predetermined level to overcome the spring means moves and actuates the over-centre lock causing movement of the brace member such that the displacement member is locked therewith to prevent movement of the first hand grip.

In such a construction, one hand grip is provided with the over-centre lock which operates against the force of the spring means, and the second hand grip operates freely until actuation of the over-centre lock which causes both hand grips to be locked up, thereby securing the workpiece.

In a preferred construction the jaws have a central interconnecting pivot with the hand grips being pivotally coupled to outer limbs of each jaw. A central brace member may extend from the pivotal interconnection of the jaws between the hand grips and is coupled with the articulated linkage joining the hand grips together. The spring means may be operatively connected between one hand grip and the brace whereby operation of the hand grips causes the jaws to be brought together until sufficient force is applied to displace the spring means by means of the hand grip, following which the articulated linkage passes through alignment into an over-centre position thereby locking the hand grips and thus the jaws in a fixed position.

In accordance with a fourth aspect of this invention there is provided a self-locking clamp including two interconnected parallel clamp jaws which may be moved together or apart linearly and by drive means to embrace and clamp a workpiece therebetween, an over-centre locking means operatively coupled with one clamp jaw and biassed to a first position by a spring member whereby on application of a predetermined force by the drive means acting between the jaws, the over-centre lock overcomes the bias of the spring member and is caused to be tripped into a second position retaining the other clamp jaw through the drive means in a fixed position. Further and preferred features in the construction of an adjustable wrench and a particular embodiment and modification thereof are described in conjunction with the accompanying drawings showing a schematic arrangement.

Figure 2:
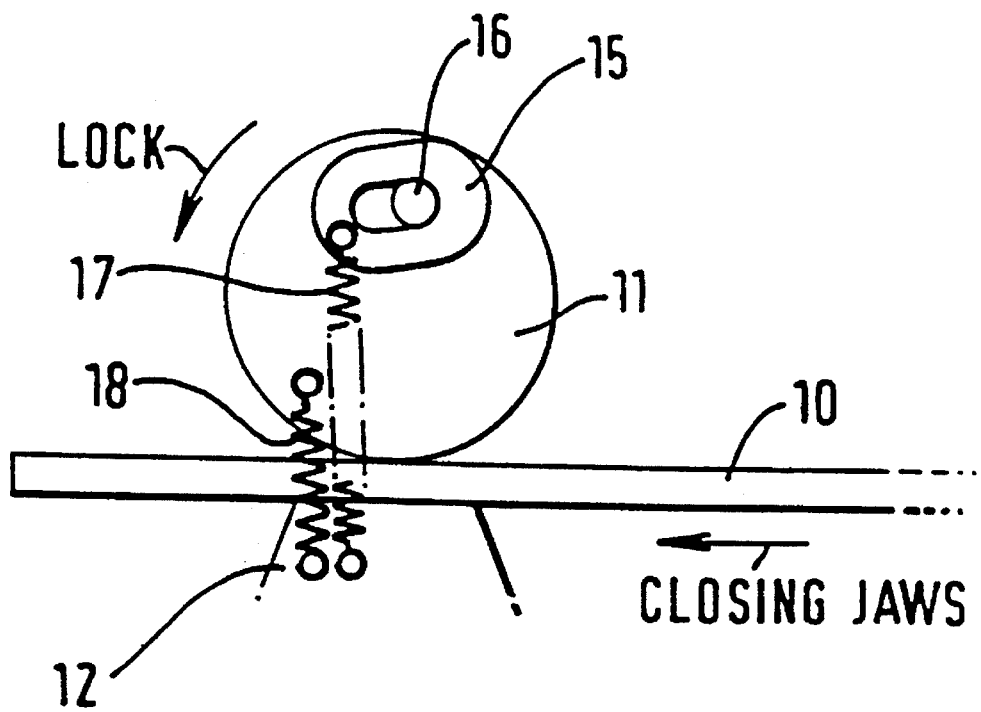
Figure 3:
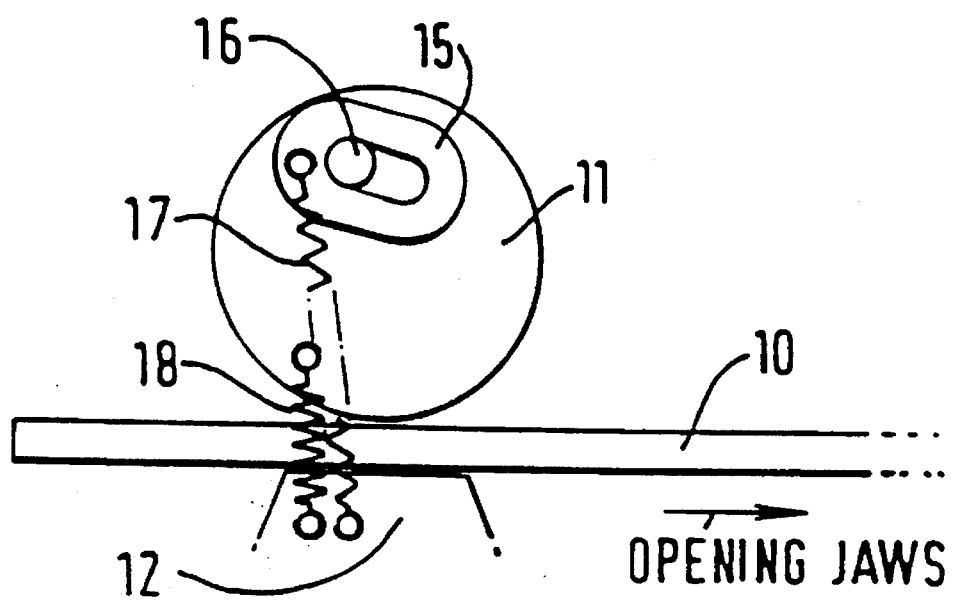
Figure 4:
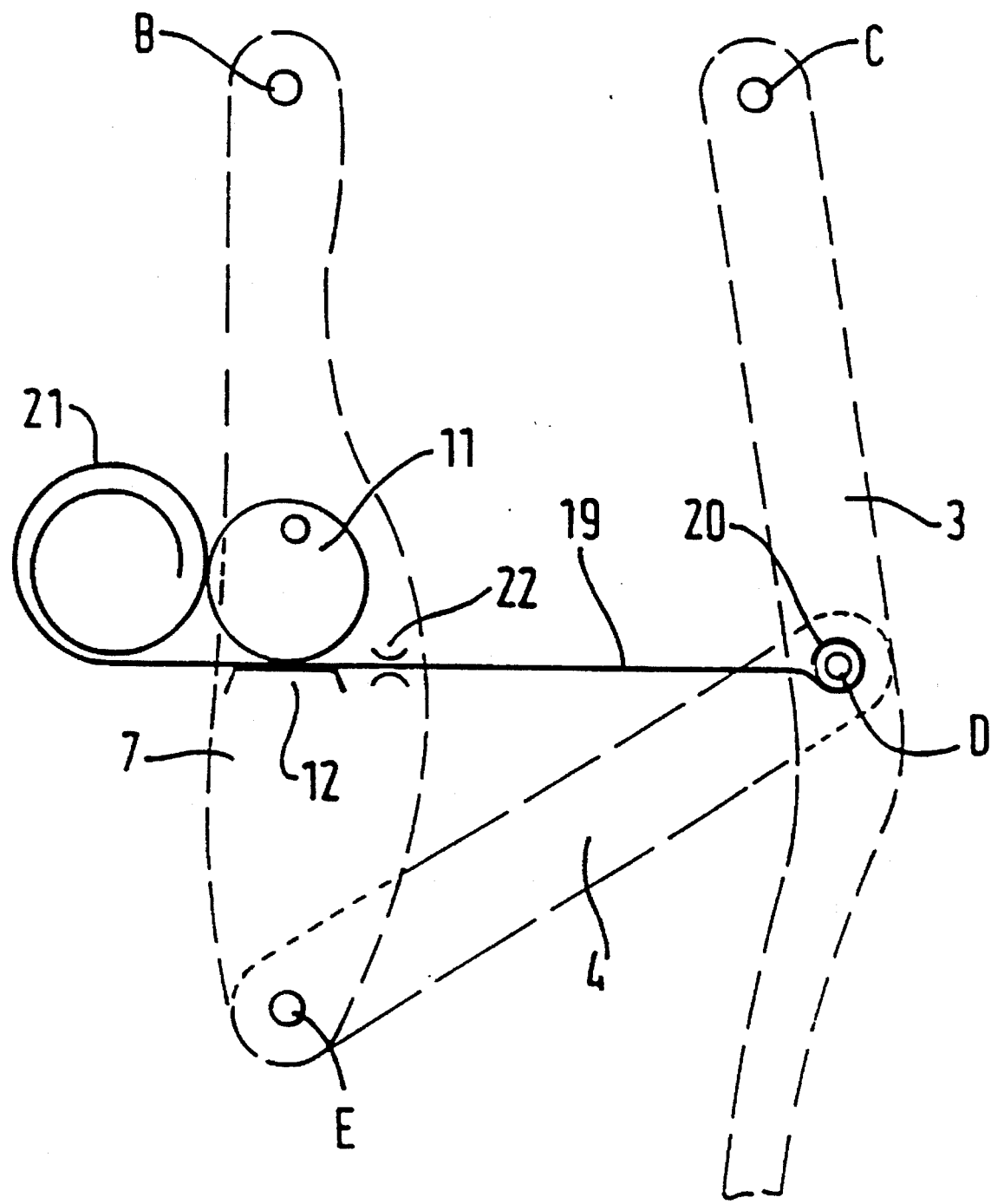

In the drawings:

FIG. 1 shows schematically one embodiment of wrench in accordance with this invention, FIGS. 2 and 3 show a modification of the locking cam, FIG. 4 shows a modified construction of wrench in part detail only, and FIG. 5 shows an adjustable clamp embodying a locking means and in accordance with this invention.

Referring to FIG. 1 of the drawings, an adjustable wrench has jaws 1 and 2 which are pivotally interconnected at B. Hand grips 3 and 6 are pivotally connected to respective jaws 2 and 1 at A and C being pivots positioned on limbs each side of pivot B and aligned along the same plane. An articulated linkage is formed between the hand grips 3 and 6 by means of arms 4 and 5 pivotally connected to respective hand grips 3 and 6 at D and F with their other ends pivotally connected with an end of a brace 7 at E. The other end of the brace 7 is connected to the pivot B between the two jaws. A locking rod 10 has one end pivotally connected to handle 3 at D and passes through a gap defined between an anvil 12 and an eccentric cam 11. Pivot F on hand grip 6 abuts a rubber stop 8 which is located with one end in a housing 9 attached to the brace 7.

The operation of the adjustable wrench shown in the drawing is as follows:

The jaws 1 and 2 are closed by forcing together hand grips 3 and 6 which holds pivot F against rubber stop 8 mounted in the housing 9, which in turn is mounted on brace arm 7; pivot D is moved towards brace 7, thus straightening line CDE and rotating jaw 2 and pivot C anti-clockwise about pivot B.

When the jaws close on to a workpiece W, resistance is met and further movement of D towards arm 7 is arrested in favour of the over-centre linkage arms 4 and 5 whereupon eccentric cam 11 locks rod 10 comprising a displacement member against anvil 12 thus holding jaw 2. The over-centre lock on the hand grip 6 locks and is prevented from going further than just over-centre by a stop G which bears on to the inside of the hand grip.

By adjustment of the rubber buffer 8 in the housing 9, the tightness of the grip can be changed, thus by setting the rubber buffer 8 more towards pivot F, a greater resistance to over-centre locking will be achieved and therefore a tighter grip. A looser grip will be achieved by the opposite adjustment procedure.

In the released position, a spring 14 holds pivot F lightly against the rubber buffer 8, which in turn is adjustable by a turn screw or similar. The resilience of the rubber buffer will determine the range of tightness required. Also in the just-released position, a spring 13 tends to open the jaws.

The proportions between the lengths of arms AB, BC, 3, 4, 5 and 6 (AF), and the length of the operating handles 3 and 6 are determined according to the use to which the device is to be put. Also, the type of non-return lock on rod 10 could be as described or a ratchet type, or any other kind of non-return but releasable lock.

In the eccentric roller type described here, release of the lock, and therefore of the jaws, could be effected by allowing the pivot 16 of the eccentric roller to be moved away from the anvil 12 by a slotted device pivoted about the same axis as pivot 16 but independently of 16, and being operable by a finger or thumb of the operating hand (FIGS. 2 and 3). By rotating the slotted device 15 clockwise about axis 16, but independently, pivot 16 is released and the force applied by roller 11 to anvil 12 through rod 10 is released also, thus allowing rod 10 to be free to return to its relaxed position. Slotted device 16 is returned to its operating position by a return spring 17, thus activating the non-return lock once more. Spring 18 serves to lock roller/pinch wheel 11 in contact with rod 10 and, indirectly, anvil 12.

By omitting rod 10, roller 11 and anvil 12, the tool could be converted to use as a cutting device, with shearing blades in place of jaws, where considerable purchase is required to cut initially, say in the form of secateurs or the like. The adjustable rubber stop 8 may or may not be required in such a use.

FIG. 4 illustrates only the pertinent features of a modification to the general arrangement shown in FIG. 1 and FIGS. 2 and 3. This concerns the non-return arrangement on the side of the tool controlled by arm 3. Experimentation has revealed that the rigid rod 10 subtends a varying angle to the pinch roller 11 and the anvil 12, thereby limiting the effectiveness of the two latter.

As the jaws of the tool are closed, the arm 4 rotates so that point D moves in an arc which varies the angle of rod 10. A modification is the provision of a non-rigid band or belt 21 forming the displacement member which has limited compressive resistance but very great tensile resistance and which is capable of bending and passing through a pair of guides which constrain the belt to maintain a constant angle to the locking cam device 11 and 12.

A preferred material for the belt is spring steel, similar to that used in clock springs and retractable measuring tapes. One end of the spring is attached to point D so that it can freely rotate as points C, D and E are articulated. The belt is routed via a pair of guides adjacent to the locking device 11 and 12, and is curled up on the far side of and is retained by cam 11, so as to allow a reserve length of belt for opening the jaws of the tool to their extremity. As point D is moved towards the locking device 11 and 12, the spring steel has enough compressive strength to be pushed through the guides 22, past 11 and 12, and to curl up on the far side of 11 and 12 because of the springiness of the steel. At the moment of the tool gripping the workpiece, the locking device locks in the usual way, by clamping the steel belt between cam 11 and anvil 12.

This modification is to be preferred over the rigid arm arrangement described.

Needless to say the operative features in the construction described can be used for gripping devices generally such as are used in robotics and automated manufacturing.

There is perceived to be an alternative to that described, as in the closing of two parallel arms on each other, as shown in FIG. 5 attached. The basic principle of one arm closing to a point where it can go no further—whereupon it locks against return—while the other arm is poised in the just-about-to-lock position, and when the arms meet the obstruction, i.e. the unit to be grasped, the over-centre locking device locks, thus retaining the object firmly grasped. It is anticipate that this configuration would have application in the materials handling field, such as fork lift trucks and the like. Robotics could be another application.

Referring to FIG. 5, the over-centre locking side of the tool remains largely unaltered. The other, adjustable side of the tool takes the form of a bar on which the other arm is mounted and moves in a manner perpendicular to the first arm 1. Arm 2, therefore, is mounted on to bar 23 on which it slides to and from arm 1, and is attached to bar 23 by a non-return arrangement using a flap which 27 bears on the bar in a manner which opposes return movement. This is known prior art.

Arm 2 is pulled towards arm 1 from point C using pull wire 26, wound round the drum of a winch 27 which is powered by an electric motor or similar, at D. This in turn is attached to point F on the over-centre lock AFE by a tie. It is mounted in a slide and may move in the direction L or R, as shown. (The winch 27 at D must be lightly spring-loaded so as to keep a tension in tie 29, and thus hold point F against the buffer 8, similar to the arrangement for the automatic grip.) Arm 1 is mounted on a pivot B and is actuated by the articulation of the over-centre lock AFE, being pulled by tie 29 from the winch 27 at D, mounted in slide 28.

The device is activated by the operation of the motor at D, which pulls arm 2 at point C via pull wire 26. When the object to be grasped is encountered, arm 2 stops, whereupon the winch 27 at D reacts by moving in direction R, thus pulling tie 29 and point F towards the rubber (or indeed any spring-like) buffer. (The winch 27 is thus spring-loaded towards the L end of its slide mounting by this buffer, as a reaction against the pull wire force in 26.) Adjustment of the buffer enables the resistance to be set against the force in pull wire 26. At this point, the over-centre lock locks and the device is retained in this mode by the non-return lock arrangement at arm 2. The action of winch 27 moving and pulling tie 29 and point F switches off the motor at D, at which point the device is in equilibrium.

It should be said that the base structure is bar 23 and the integral portion of its extension at the over-centre lock end, on which the over centre lock arrangement is mounted. This is the only way in which the device differs from the automatic gripping tool previously described.

The release mechanism of the device is not the subject of this specification, but it may be effected by the operation of rotating a cam at G, thus unlocking the over-centre lock. Release of the non-return lock 25 may also be the subject of another or similar arrangement.

In the drawing 30 is a means of reopening the jaws with pulley 31, arms herein being equivalent to the jaws.

I claim:

1. A self-locking hand tool including two pivotally interconnected jaws which may be moved together or apart to embrace a workpiece, hand grips pivotally connected to each jaw, an articulated linkage pivotally interconnecting the hand grips and the jaws whereby a force applied between the hand grips causes the jaws to be forced together and an over-centre locking means operatively coupled with the hand grips and the articulated linkage and associated with a spring member whereby on application of a predetermined force to the hand grips, the over-centre lock is caused to be tripped into a position retaining the hand grips and the jaws in a fixed position.

2. A self-locking hand tool including two pivotally interconnected jaws adapted to receive and clamp a workpiece, hand grip members pivotally connected to each respective jaw, a brace member pivotally connected to the pivotal interconnection between the two jaws at its one end, with the other end thereof connected by articulated linkages to pivots on each respective hand grip, one hand grip having a locking member co-operating with the brace member and the other hand grip having a spring means with the relevant articulated linkage forming an over-centre lock, the arrangement being such that the one hand grip freely moves the jaw connected therewith and wherein the second hand grip following application of a force above a predetermined level, actuates the over-centre lock displacing the brace member and further locking the first hand grip.

3. A self-locking hand tool in accordance with claim 2, wherein one hand grip is provided with the over-centre lock which operates against the force of the spring means, and the second hand grip operates freely until actuation of the over-centre lock which causes both hand grips to be locked up, thereby securing the workpiece.

4. A self-locking hand tool in accordance with claim 2, wherein the jaws have a central interconnecting pivot with the hand grips being pivotally coupled to outer limbs of each jaw.

5. A self-locking hand tool in accordance with claim 2, wherein a central brace member extends from the pivotal interconnection of the jaws between the hand grips and is coupled with the articulated linkage joining the hand grips together.

6. A self-locking hand tool in accordance with claim 2, wherein the spring means is operatively connected between one hand grip and the brace whereby operation of the hand grips causes the jaws to be brought together until sufficient force is applied to displace the spring means by means of the hand grip, following which the articulated linkage passes through alignment into an over-centre position thereby locking the hand grips and thus the jaws in a fixed position.

7. A self-locking hand tool including two pivotally interconnected jaws adapted to receive and clamp a workpiece, hand grip members pivotally connected to each respective jaw, a brace member pivotally connected to the pivotal interconnection between the two jaws at its one end, with the other end thereof connected by respective articulated linkages to pivots on each respective hand grip, one hand grip having a displacement member to lockingly engage the brace member and the other hand grip being connected through a spring means with the brace member, and further being coupled with the relevant articulated linkage, said linkage forming an over-centre lock, the arrangement being such that the one hand grip freely moves the jaw connected therewith and wherein the second hand grip following application of a force above a predetermined level to overcome the spring means moves and actuates the over-centre lock causing movement of the brace member such that the displacement member is locked therewith to prevent movement of the first hand grip.

8. A self-locking hand tool in accordance with claim 7, wherein the displacement member has a limb extending between two opposed abutments on the brace member, the abutments forming a lock.

9. A self-locking hand tool in accordance with claim 8, wherein the abutments are relatively movable, one abutment preferably comprising a rotatable cam member.

10. A self-locking hand tool according to claim 8 wherein the displacement member has a limb formed from a strip of spring material.

11. A self-locking hand tool according to claim 1, wherein the spring means comprises a buffer of a resilient compressible material such as rubber.

12. A self-locking hand tool according to claim 11, wherein the spring means is adjustable to define the predetermined force required to operate the over centre lock.

13. A self-locking clamp including two interconnected parallel clamp jaws which may be moved together or apart linearly and by drive means to embrace and clamp a workpiece therebetween, an over-centre locking means operatively coupled with one clamp jaw and biassed to a first position by a spring member whereby on application of a predetermined force by the drive means acting between the jaws, the over-centre lock overcomes the bias of the spring member and is caused to be tripped into a second position retaining the other clamp jaw through the drive means in a fixed position.

* * * * *